June 1, 1948. J. H. RUBENSTEIN 2,442,732
MAGNETOMETER
Filed April 16, 1945 3 Sheets-Sheet 2
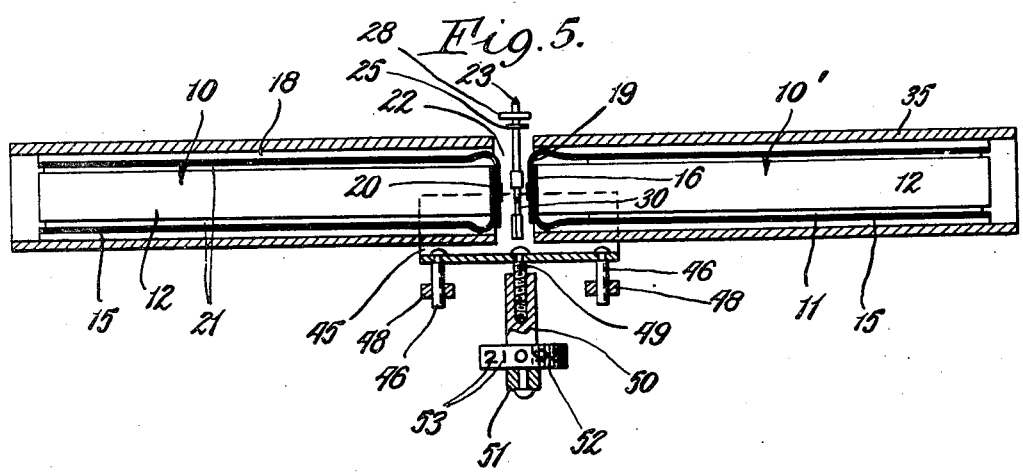
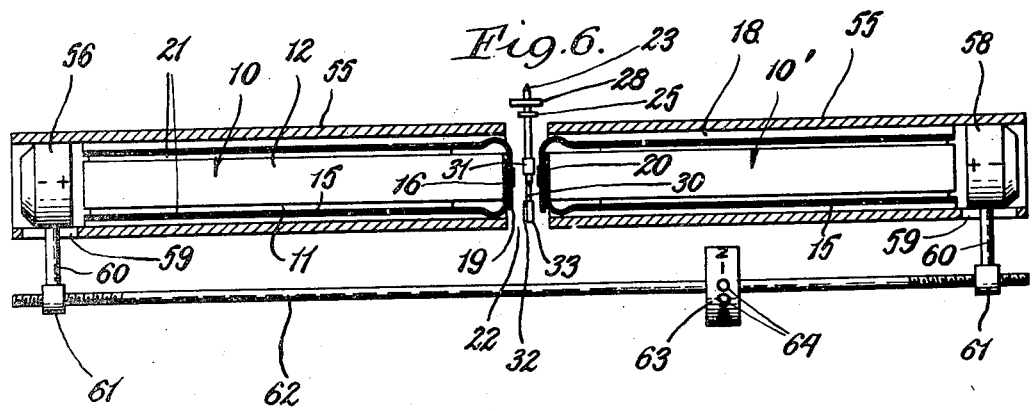
INVENTOR.
Jacob H. Rubenstein
BY Popp and Popp
ATTORNEYS Patented June 1, 1948

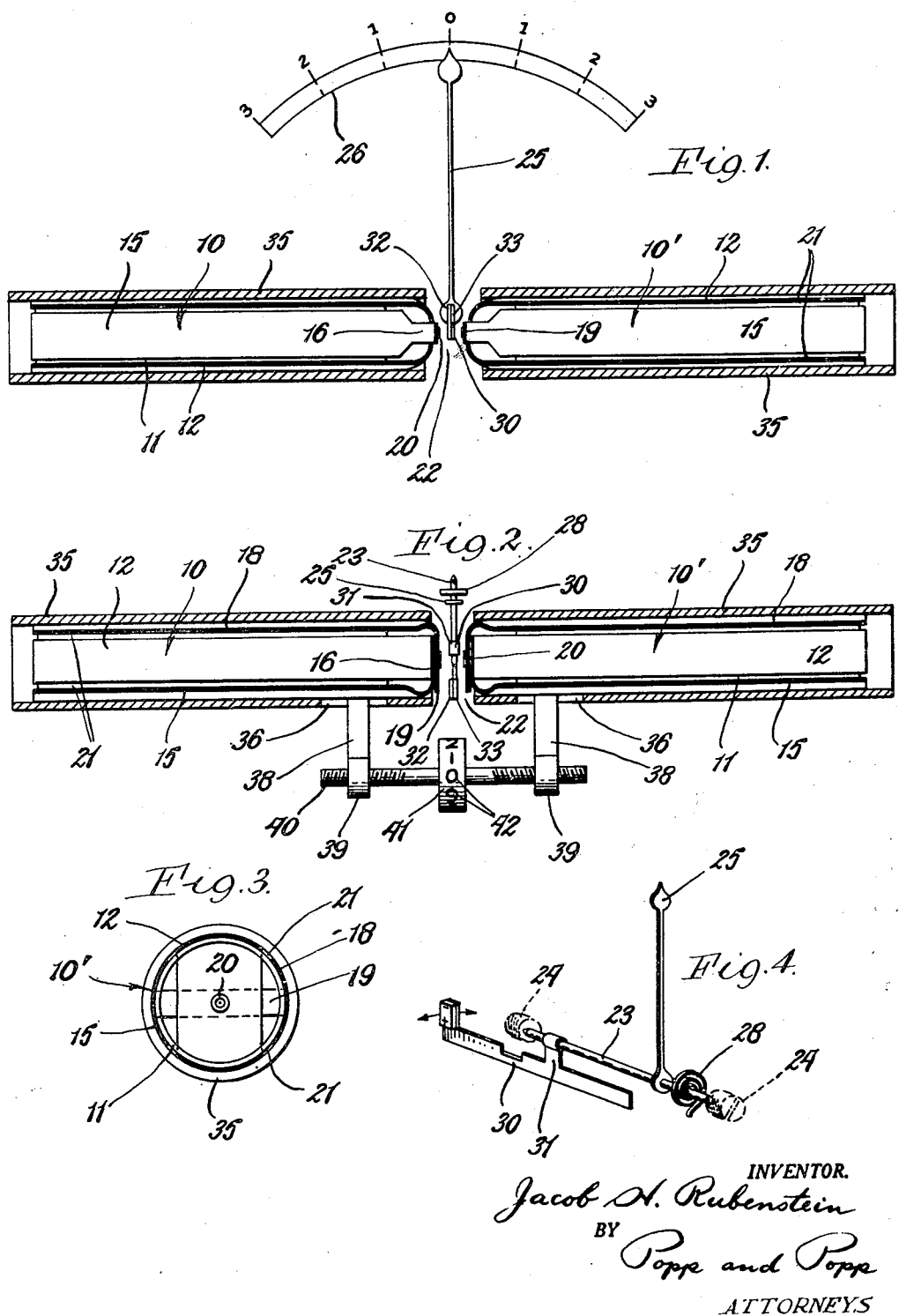

2,442,732

UNITED STATES PATENT OFFICE 2,442,732

MAGNETOMETER

Jacob H. Rubenstein, Buffalo, N. Y.

Application April 16, 1945, Serial No. 588,562

1 Claim. (Cl. 175—183)

This invention relates to a magnetometer for determining the direction or intensity of the lines of force of a magnetic field, such as the earth's magnetic field, and which can be used to determine the magnetic meridian of the earth's magnetic field, its horizontal, vertical and total force components and the angles of inclination and declination thereof. Such magnetometers have a wide range of uses, such as in navigation instruments and as a traffic detector to operate in response to passing vehicles. In such uses it is desirable to provide a highly sensitive magnetometer to measure slight changes in these values. Further, these values are different at different locations around the earth and when using a magnetometer as a navigation instrument it is frequently desirable to permit of compensation for these changing values by an adjustment of the sensitivity or range of movement of the magnetometer.

This application is a continuation in part of my copending applications for patent Serial No. 562,728, filed November 9, 1944, for Method and apparatus for determining the direction or intensity of the lines of force of a magnetic field, now abandoned, and Serial No. 576,343, filed February 5, 1945, for Magnetometer.

The desirability of such adjustment is referred to in my copending application for Method for determining the position of a body with reference to the earth, Serial No. 578,075, filed February 15, 1945. For example, to maintain a constant amplitude or range of movement of the pointer or control element of the magnetometer in traveling toward the earth's magnetic equator, a progressive decrease in the sensitivity, i. e. scale compression, is required to compensate for the increase in the horizontal component or the decrease in the angle of inclination as the magnetic equator is approached. Reverse compensation is required in traveling from the earth's magnetic equator toward either magnetic pole.

One of the principal objects of the invention is to provide a magnetometer the sensitivity of which is greatly augmented by the use of permanent magnets which serve to attract a large sheath or cylinder of the lines of force from the surrounding magnetic field for measurement.

Another object is to so arrange these permanent magnets that they do not alter the response of the magnetometer except to increase the amplitude of the response.

Another principal object of the present invention is to provide an adjustment for the sensitivity, to any desired degree, of a magnetometer to permit of expanding or contracting the range or amplitude of movement of its pointer or control element.

Another object is to provide such a sensitivity adjustment which does not alter the wave form of the response of the magnetometer when rotated in a magnetic field being measured.

Another object is to provide such a sensitivity adjustment for a magnetometer which does not act through a variable loading of the magnetometer but which directly varies the number of lines of force to which the magnetometer is responsive under a given condition, thereby to avoid the variable factors inherent in adjustable loading of a sensitive instrument.

Another aim is to provide such a sensitivity adjustment which is regularly progressive in its action to permit a regular change in adjustment to compensate for regularly changing conditions.

Another purpose is to provide such a sensitivity adjustment which is itself sensitive and at the same time stable so as to remain in any adjusted position regardless of operating conditions.

Another object is to provide such a sensitivity adjustment which can be used in connection with any magnetometer employing an antenna member for attracting the lines of force being measured.

Another object is to provide such a sensitivity adjustment which is easily operated, is compact and light in weight and is not liable to get out of order under conditions of severe and constant use.

Other objects and advantages will appear from the following description and drawings in which:

Fig. 1 is an elevational view of the antenna members, movement and scale of a magnetometer embodying the present invention, the support or casing being eliminated for clarity, this magnetometer having one form of sensitivity adjustment.

Fig. 2 is a top plan view of the antenna members movement and sensitivity adjustment shown in Fig. 1.

Fig. 3 is an end view of one of the antenna members shown in Figs. 1 and 2.

Fig. 4 is a perspective of the movement shown in Figs. 1 and 2.

Fig. 5 is a view similar to Fig. 2 and showing a modified form of sensitivity adjustment embodying the invention.

Fig. 6 is a view similar to Fig. 2 and showing another modification of the sensitivity adjustment embodying the invention.

Figure 7:
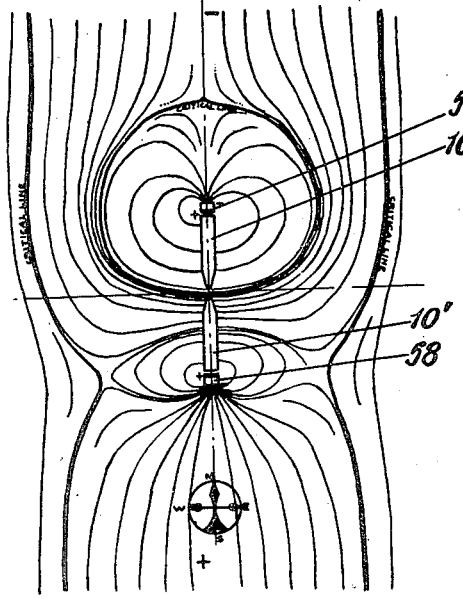
Fig. 7 is an isomagnetic chart of the lines of force surrounding the form of magnetometer shown in Fig. 6, the magnetometer being diagrammatically illustrated as parallel with the lines of the earth's magnetic field or in zero degrees relation thereto.

Because of its simplicity, stability, accuracy and independence from an outside power source, the sensitivity adjustment forming the subject of the present invention is shown in connection with the magnetometer forming the subject of my said copending patent application Serial No. 576,343, filed February 5, 1945. However, forms of the sensitivity adjustment can be used with other forms of magnetometers, such as the magnetometer described in may said copending application Serial No. 562,728, filed November 9, 1944.

In the magnetometer illustrated herein antenna members are employed to attract a large sheath or cylinder of the lines of force of the field to be measured, this feature supplying the necessary power for operating the magnetometer so as to eliminate the necessity for an external source of power. A pair of such antenna members are provided in spaced coaxial arrangement and a lever polarized by a permanent magnet is rotatably mounted with its free polarized end in the concentrated field between the two antenna members, thereby to be attracted toward one or the other depending upon the polarity of the antenna members as determined by the position of the antenna array with reference to the magnetic field under measurement.

The antenna members, indicated generally at 10 and 10', are identical in construction, a preferred form being shown in the drawings in which each antenna member includes a round tubular core 11 of brass or other non-magnetic material so that each antenna member is hollow and generally round in cross section. On this tubular core is wrapped a plurality of laminations of high initial magnetic permeability and low coercive force. These laminations are shown as being arranged in pairs, one pair 12 extending along one side of the core 11, around that end of the core which opposes the other antenna member, and along the opposite side of the core, the ends of the laminations terminating adjacent the outer extremities of the cores. The legs or parallel portions of this pair of laminations are preferably transversely curved to fit the core 11. Another pair 15 of these laminations is L-shaped in longitudinal section, the laminations being curved to fit one or the other sides of the tubular core 11 and having an end 16 of reduced width overlapping the pair 12 of laminations at the inner extremity of each antenna member. A third pair 18 of these laminations is likewise L-shaped in longitudinal section and curved to fit the fourth side of the tubular core 11 and has an end 19 of reduced width overlapping the ends 16 of the pair 15 of laminations at the inner extremity of each antenna member. The overlapping portions of the pairs 12, 15 and 18 of laminations can be secured together in any suitable manner as by the axially positioned brass eyelet or grommet 20 shown and the opposite extremities of these laminations can be secured to the tubular core 11 in any suitable manner.

It will be noted that each antenna member is composed of a group of metal laminations of high initial magnetic permeability which are arranged in the general form of a cylinder, this being an important feature of the magnetometer. However, it is also an important feature of the magnetometer that this cylindrical form of the laminations of each antenna member be broken by one or more longitudinally extending gaps, such as the four gaps 21, these gaps breaking up the otherwise ring form of the antenna in cross section and hence any substantial tendency toward transverse polarization.

The two antenna members 10, 10' are arranged in axially opposed relation to each other with the overlapped ends of their laminations spaced to provide a gap 22. In this gap and in approximate alinement with the axis of the two antenna members is arranged the free end of a polarized lever which forms a part of the movement illustrated in perspective in Fig. 4.

This movement includes a shaft 23 which is supported at its ends in bearings 24 in the casing or support of the magnetometer. An indicating hand or pointer 25 is fast to this shaft and traverses a scale 26 which is shown as having a zero centerpoint, although any appropriate graduation indicia can be employed. A hairspring 28 has one end secured to the shaft 23 to bias the pointer 25 toward its zero position, the other end of this hairspring being secured to the support or casing for the magnetometer. As previously indicated, for clarity, this support or casing is not illustrated.

Fast to the shaft 23 is an iron vane 30, this iron vane being secured by a lever arm 31 which embraces the shaft 23 so that the iron vane is, in effect, a lever fast to the shaft 23 and with its free end generally in line with the axis of the antenna members 10, 10' and at right angles thereto in its neutral or zero position so that the free end of the lever is capable of being attracted toward one antenna member 10 or the other antenna member 10'.

The iron vane is polarized and for this purpose a small strip 32 of aluminum is secured to one end of the iron vane to project toward its axis of rotation. The projecting end of this strip 32 of aluminum carries a small permanent magnet 33, this permanent magnet preferably being of high coercive force alloy to produce a field of high magnetic strength. This permanent magnet is shown as having its end of positive polarity in contact with the edge of the iron vane so that the entire iron vane is of positive polarity, as indicated.

The magnetometer, as above described, can be used to determine the magnetic meridian of the earth's magnetic field, the horizontal, vertical and total force components of the field, and the angle of inclination and declination of the lines of force thereof. For example, if the magnetometer is rotated so that the axis of the antenna members 10, 10' traverses the magnetic meridian, when the axis of the antenna members becomes parallel with the lines of force of the field, a large sheath or cylinder of the lines of force is attracted from the surrounding field into the antenna members 10, 10' and forms a concentrated field across the gap 22. The polarity of the antenna array will depend upon the polarity of the lines of force of the field. Thus, if the array is arranged so that the right hand antenna member 10' is parallel with the lines of force and projects toward the north geographic pole of the earth its right hand or outer end is of plus polarity by induction and its opposite or inner end is polarized negatively by induction. Conversely, the polarization of the opposite or left hand antenna member 10 by induction is negative at its outer or left hand end and positive at its inner or right hand end. Since the iron vane 30 is positively polarized it will, under these conditions, be attracted toward the right, as viewed in Figs. 1 and 2, or toward the negatively polarized inner end of the right hand antenna member 10'. This movement of the iron vane 30 to the right swings the pointer 25 to the left hand extremity of the scale 26.

As the array of antenna members 10, 10' is swung out of alinement with the lines of force of the surrounding field, the number of lines of force attracted to the array to traverse its axis progressively diminishes. Consequently, the strength of polarization of the array diminishes and the iron vane 30, under the influence of the hairspring 28, moves away from the weakening negative pole at the inner end of the right hand antenna member 10' thereby to progressively move the pointer 25 to the right toward the centered or zero position on the scale 26. When the array, so rotated out of alinement with the lines of force of the surrounding field, reaches a position where it is at right angles to the lines of force none of these lines of force are attracted to the array to traverse its axis. In this position all of the lines of force of the surrounding field pass through the array transversely. Consequently, the array is not axially polarized and the pointer 25 is held at its zero position solely under the influence of the hairspring 28.

As the assumed rotation of the magnetometer in the magnetic meridian is continued from this neutral or zero position, the number of lines of force attracted to the antenna array to traverse its axis progressively increases. However, the right hand antenna member 10', as viewed in Figs. 1 and 2, is now being rotated toward the south geographic pole of the earth and hence the polarity of the array is reversed. The inner end of the right hand antenna member 10', as viewed in Figs. 1 and 2, is now polarized positively by induction and the inner end of the left hand antenna member 10 negatively by induction. Consequently, the positively polarized iron vane 30 is attracted to the left, as viewed in these figures, so as to cause the pointer 25 to traverse the right hand side of the scale 26.

As the antenna array is so rotated toward realinement with the lines of force of the earth's magnetic field, the number of lines of force attracted to the array to traverse its axis progressively increases, a larger and larger cylinder of these lines being so attracted. As a consequence the pointer 25 is moved further along the right hand side of the scale 26 until the point is reached where the array is again in alinement with the lines of force of the surrounding field and the maximum number of lines of force are attracted to the antenna array to traverse its axis. Consequently, the polarity of the array is at maximum strength and the pointer 25 is at the extreme right hand position on the scale 26. Since the polarity of the array is reversed as compared with the condition first assumed, the pointer 25 is at the opposite extremity of the scale 26 as compared with the position first assumed.

In the form of the invention shown in Figs. 1-4, the adjustment of the sensitivity of the magnetometer is effected by adjustably moving the antenna members 10, 10' toward and from each other. For this purpose each antenna member 10, 10' is shown as slidingly mounted in a tube 35 of brass or other non-magnetic material, these tubes 35 being fixed in any suitable manner to the support or casing (not shown). Each of these guide tubes 35 is shown as being provided with a longitudinal slot 36, these slots being in line with each other and being located near the opposing ends of the guide tubes. An arm 38 of brass or other non-magnetic material is shown as fixed to the brass core 11 of each antenna member, each of these arms 38 projecting outwardly through a corresponding slot 36 and having a threaded eye 39 at its outer end. The openings in the eyes 39 are reversely threaded with respect to each other and are in line with each other to receive the ends of a threaded adjusting screw 40, of brass or other non-magnetic material, the opposite ends of this screw 40 being likewise reversely threaded. At its center this screw 40 is shown as carrying a fixed adjusting wheel 41, the periphery of which can be calibrated as indicated at 42, this wheel also being of brass or other non-magnetic material. It will be seen that upon manually turning the adjusting wheel 41 and screw 40 the arms 38 will be drawn together or moved apart, the relative position of these arms being indicated by the calibrations 42. Since the arms 38 are fast to the antenna members 10, 10', these antenna members are accordingly adjusted with reference to each other, these antenna members sliding in the supporting tubes 35.

Moving the antenna members away from each other, other conditions being equal, increases the leakage flux path around the polarized iron vane 30. Hence there is decreased magnetic reaction between the polarized iron vane and the antenna members resulting in a decreased amplitude of the pointer movement along the scale 26. This provides decreased sensitivity. Conversely, on so adjusting the antenna members 10, 10' toward each other, less leakage of the lines of force between the opposing ends of the antenna members occurs around the polarized iron vane 30 and hence the response in the movement of the polarized iron vane is increased so that the pointer has an increased amplitude of movement along the scale 26 when the magnetometer is rotated in the field under measurement.

In the form of the invention shown in Fig. 5, the adjustment of the sensitivity of the magnetometer is achieved by providing an adjustable shunt, in the form of a piece of high permeability material, across the gap between the antenna members 10, 10' so that an adjustable amount of flux can be bypassed around the iron vane 30 and thereby increase or decrease the amplitude of the meter reading. The shunt 45 is shown as being of semi-cylindrical channel form parallel with and embracing, to an adjustable extent, the opposing ends of the antenna members 10, 10'. This shunt is shown as adjustable toward and from the antenna members in a direction at right angles to the axis thereof and to guide the shunt in this movement it is shown as provided at its ends with fixed pins 46 which extend through guideways provided in a pair of guide lugs 48 which form part of the magnetometer casing (not shown). At its center the shunt is shown as having fixed thereto a threaded stud 49 which projects parallel with the guide pins 46. This threaded stud is engaged by an adjusting nut 50 which is rotatably mounted on a supporting lug 51 projecting from the magnetometer casing (not shown). The nut 50 can be turned by an integral adjusting wheel 52 which can be calibrated as indicated at 53.

The mounting for the nut 50 permits rotation of this nut but prevents axial movement thereof and it will therefore be seen that turning the hand wheel 52 moves the threaded stud 49 axially and hence moves the shunt 50 toward and from the axis of the antenna members. As a greater amount of flux will be shunted through the member 45 as it is moved closer to the antenna members, a smaller proportion of these lines of force pass through the polarized iron vane 30 and hence the amplitude of movement of the pointer along the scale is reduced for the magnetic force under measurement. Conversely, moving the shunt 45 away from the antenna members 10, 10', by adjustment of the wheel 52, reduces the shunted flux and increases the number of lines of force effective upon the polarized iron vane 30 thereby to expand the range of movement of the magnetometer.

In the form of the invention shown in Fig. 6, the adjustment of the sensitivity is achieved by adjustably introducing one or more permanent magnets to excite the antennas so as to bring them up to a higher point on the BH curve thereby to increase their initial permeability. Further, in such use of permanent magnets at least one of the magnets serves to attract a large sheath of the lines of force of the surrounding magnetic field to traverse the axis of its antenna member.

In Fig. 6 the antenna members 10, 10' are each shown as enclosed within a tube 55 of brass or other non-magnetic material, these tubes serving to support the antenna members from the magnetometer casing (not shown) and also serving to support permanent magnets 56, 58 at the opposite ends of the array for movement toward and from the antenna members. These permanent magnets are shown as arranged in magnetic opposition to each other, their positive poles being shown as arranged in opposition and adjacent the ends of the antenna members 10, 10', respectively. Each of the tubes 55 is shown as being provided, alongside the enclosed permanent magnet, with a longitudinal slot 59, these slots being arranged in line with each other. An arm 60 of brass or other non-magnetic material is shown as fixed to each permanent magnet, each of these arms 60 projecting out through the corresponding slot 59 and having a threaded eye 61 at its outer end. The openings in the eyes 61 are reversely threaded with respect to each other and are in line with each other to receive the ends of a threaded adjusting screw 62 of brass or other non-magnetic material, the opposite ends of the screw 62 being likewise reversely threaded. At its center this screw 62 is shown as carrying a fixed adjusting wheel 63 the periphery of which can be calibrated, as indicated at 64, and this adjusting wheel also being of brass or other non-magnetic material.

As with the form of the invention shown in Figs. 1–4, it will be seen that upon manually turning the adjusting wheel 63 and screw 62 the arms 60 and permanent magnets 56, 58 will be drawn together or moved apart, the relative position of these permanent magnets being indicated by the calibrations 64.

In the operation of the form of the invention shown in Fig. 6, when the array of antenna members 10 is rotated, as shown in the isomagnetic chart, Fig. 7, to a position parallel with the lines of force of the surrounding magnetic field, that is, at zero degrees angularity, one of the permanent magnets, such as the permanent magnet 56 as shown, is in a position of like polarity to the surrounding field and this magnet provides a closed field which includes its antenna member 10, this permanent magnet 56 and antenna member 10 being thereby, in effect, removed from the array in this position. The other antenna member 10' is, however, polarized by its permanent magnet 58 in unlike relation to the surrounding field and hence attracts a large sheath or cylinder of lines of force from the surrounding field to traverse the axis of this other antenna member 10', the size of the sheath or cylinder of lines of force so attracted being greatly augmented by the presence of the permanent magnet. As this other antenna member 10' is axially polarized, the iron vane will be moved in response thereto and since the permanent magnets 56, 58 are shown as having their positive ends opposing the antenna members, the inner end of this other antenna member 10' is positively polarized and hence repels the positively polarized iron vane 30. Accordingly, the pointer 25 will be moved along the scale 26 in a corresponding direction to the maximum amplitude.

Figure 8:
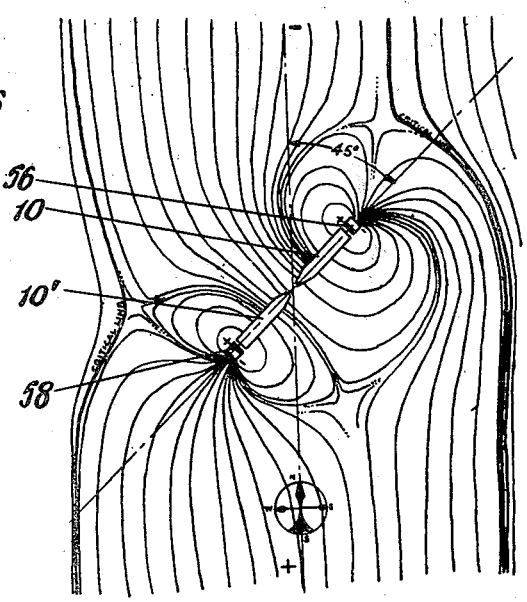
Fig. 8 is a view similar to Fig. 7 showing the magnetometer turned to a 45° position with reference to the lines under measurement.

Upon rotating the array from this zero to a 45° position with reference to the lines of force under measurement, as shown in Fig. 8, the lines of force attracted by the permanent magnet 58 and its antenna member 10' progressively decrease and the lines of force attracted by the antenna member 10 and its permanent magnet 56 increase.

Figure 9:
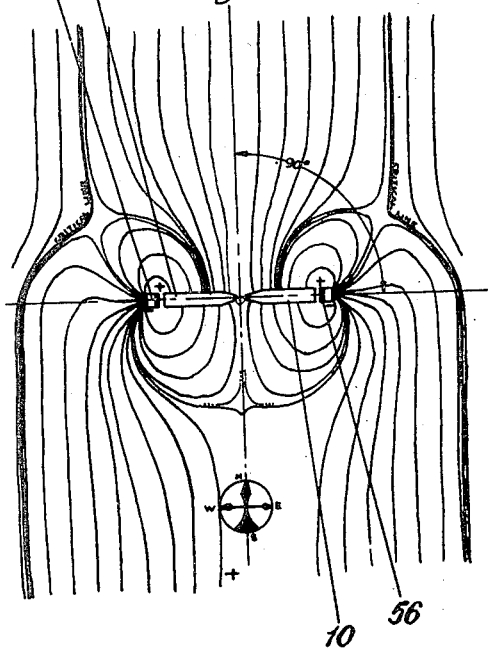
Fig. 9 is a view similar to Figs. 7 and 8 and showing the magnetometer turned to a 90° position with reference to the lines under measurement.

When the array is rotated to the 90° position, as shown in Fig. 9, the antenna members 10, 10' are at right angles to the lines of force and as the permanent magnets 56, 58 are in opposition to each other and of the same strength and equidistant from the iron vane 30, these magnets do not attract any external lines of force to pass axially through the array. Therefore the entire array is in a neutral position and the iron vane 30 is not influenced and the pointer is held at the zero position on the scale 26 by the hairspring 28.

It will therefore be seen that the array with the opposed permanent magnets 56, 58, as shown in Fig. 6, operates in the same manner as the array shown in Figs. 1–4 except that the predominating magnet attracts a larger sheath or cylinder of the external lines of force than the unexcited array of Figs. 1–4 in all positions other than the 90° or 270° position. In the 90° or 270° position neither the excited nor unexcited array attracts the external flux to pass axially therethrough and both register zero.

Figure 10:
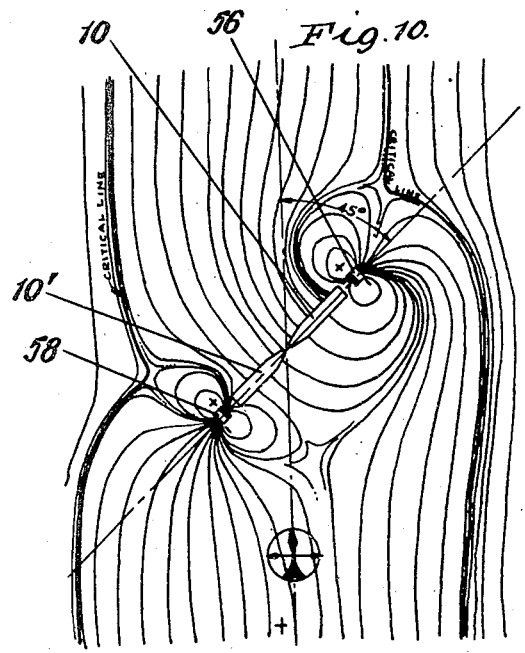
Fig. 10 is a view similar to Fig. 8 but showing the permanent magnets adjusted further outwardly from the antenna member and illustrating the reduced sensitivity obtained by this adjustment of the permanent magnets.

As the permanent magnets are adjusted outwardly, as shown in Fig. 10, by turning the calibrated wheel 63, fewer lines of force are attracted to the array to traverse its axis and consequently the pointer traverses a smaller range of the scale 26 in response to an external field of a certain value. Thus, so moving the permanent magnets outwardly moves the operating point of the array on the BH curve so as to, in effect, decrease the initial permeability of the antenna members 10, 10'. As a more demonstrable explanation of this effect of shifting the permanent magnets 56, 58 outwardly, as illustrated in Fig. 10, as these permanent magnets are shifted outwardly each forms an increasingly enlarging closed magnetic field around the permanent magnet itself. This is obtained by the elimination of the adjacent antenna member 10, 10' from this field. As the antenna member is therefore excited to a reduced degree by the permanent magnets its attractive effect is reduced and fewer lines of force of the external field are attracted to traverse the axis of the array. In consequence a reduced force is exerted on the iron vane 30 and scale compression results.

Comparing Fig. 8, in which the permanent magnets 56, 58 are adjusted close to the antenna array, with Fig. 10, in which these magnets are adjusted to positions remote from the array, it will be seen, by actual count, that the number of lines of force entering the antenna array in Fig. 8 exceed the number entering the antenna array in Fig. 10. In these figures the array is at the same angle relative to the magnetic meridian. It will therefore be seen that adjusting the permanent magnets 56, 58 outwardly decreases the number of lines of force effective upon the iron vane 30 and hence decreases the sensitivity or causes scale compression of the magnetometer. Conversely, inward adjustment of these permanent magnets increases the sensitivity of the magnetometer.

From the foregoing it will be seen that the form of the invention shown in Figs. 6-10 provides a highly sensitive magnetometer, as compared with that shown in Figs. 1-4, by the addition of the permanent magnets 56, 58. Further, by arranging these magnets in magnetic opposition to each other and having these permanent magnets of equal strength and equally spaced from the center of the array, the wave form of the magnetometer, as shown in Figs. 1-4 is not altered by the addition of the permanent magnets 56, 58, only the amplitude being increased. Further, in all forms of the invention stable, accurate and easily manipulated adjustments for the sensitivity of any antenna magnetometer are provided.

I claim as my invention:

In a magnetometer, a pair of longitudinally spaced antenna members having high permeability and concentrating an external magnetic field in the space therebetween, means in said space and responsive to changes in the flux of the concentrated field therein, means measuring changes in the response of said flux responsive means, means for varying the number of lines of force in said concentrated field in said space independently of said external field, comprising means for supporting said antenna members for movement toward and from each other, and means for adjustably moving said antenna members toward and from each other in equidistant relation to said flux responsive means to provide a sensitivity adjustment for the magnetometer, comprising a screw having its ends reversely threaded with respect to each other, an internally threaded member screwed on each end of said screw and operatively connected with a corresponding one of said antenna members, and means for turning said screw.

JACOB H. RUBENSTEIN.

REFERENCES CITED

The following references are of record in the file of this patent:

UNITED STATES PATENTS

| Number | Name | Date |
|---|---|---|
| 1,215,867 | Romain | Feb. 13, 1917 |
| 1,587,010 | Coley | June 1, 1926 |
| 1,746,627 | Babbitt | Feb. 11, 1930 |
| 1,792,639 | Herrick | Feb. 17, 1931 |
| 1,863,415 | Rieber | June 14, 1932 |
| 1,863,421 | Tear | June 14, 1932 |
| 2,067,804 | Thorne | Jan. 12, 1937 |
| 2,123,045 | Hoare | July 5, 1938 |

FOREIGN PATENTS

| Number | Country | Date |
|---|---|---|
| 134,338 | Great Britain | Nov. 4, 1919 |
| 661,200 | France | Mar. 4, 1929 |